United States Patent
Su et al.

(10) Patent No.: US 9,732,836 B2
(45) Date of Patent: Aug. 15, 2017

(54) HARMONIC DRIVE FEATURING HELIX-FACILITATED LUBRICATION

(71) Applicant: HIWIN TECHNOLOGIES CORP., Taichung (TW)

(72) Inventors: Cheng-Ming Su, Taichung (TW); Jian-An Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 190 days.

(21) Appl. No.: 14/876,474

(22) Filed: Oct. 6, 2015

(65) Prior Publication Data

US 2017/0097082 A1    Apr. 6, 2017

(51) Int. Cl.
*F16H 35/00* (2006.01)
*F16H 49/00* (2006.01)
*F16H 57/04* (2010.01)

(52) U.S. Cl.
CPC ......... *F16H 49/001* (2013.01); *F16H 57/042* (2013.01)

(58) Field of Classification Search
CPC .................................................... F16H 49/001
USPC ........................................................ 74/640
See application file for complete search history.

(56) References Cited

U.S. PATENT DOCUMENTS

| 5,984,048 | A  | * | 11/1999 | Kiyosawa | F16H 49/001 184/6.12 |
| 6,564,677 | B1 | * | 5/2003  | Kiyosawa | F16H 35/10 475/162 |
| 7,905,326 | B2 |   | 3/2011  | Kiyosawa et al. | |
| 2007/0157760 | A1 | * | 7/2007 | Kiyosawa | F16C 19/52 74/640 |

FOREIGN PATENT DOCUMENTS

JP    Y1994015151    4/1994

* cited by examiner

*Primary Examiner* — Ha D Ho
(74) *Attorney, Agent, or Firm* — Muncy, Geissler, Olds & Lowe, P.C.

(57) ABSTRACT

A harmonic drive featuring helix-facilitated lubrication includes a circular spline, a flexspline, a wave generator, and an agitating member. The flexspline meshes with the circular spline. The wave generator has a bearing installed within the flexspline, an elliptic wheel positioned in the bearing, and a shaft coupling connecting the elliptic wheel. The agitating member is located in a lubricant-holding space between the wave generator and the flexspline, and has a rotatory part and blade parts formed about a rotatory part. The rotatory part of the agitating member is connected to the shaft coupling of the wave generator, so that when the agitating member is driven by the shaft coupling, the helical blade parts agitate lubricant to perform convection, thereby better lubricating the bearing of the wave generator.

10 Claims, 8 Drawing Sheets

HARMONIC DRIVE FEATURING HELIX-FACILITATED LUBRICATION

BACKGROUND OF THE INVENTION

1. Technical Field

The present invention relates to harmonic drives, and more particularly to a harmonic drive featuring helix-facilitated lubrication.

2. Description of Related Art

A harmonic drive is a reducer featuring high reduction ratio. It conventionally comprises a circular spline, a flexspline positioned inside the circular spline, and a wave generator rotatably installed in the flexspline. When the wave generator is assembled in the flexspline, the flexspline deforms into an elliptic shape as it is pressed by the outer periphery of the wave generator from inside. Thereby, when the wave generator is driven by a power source to rotate, the circular spline and the flexspline mesh with each other fittingly at the major axis of the wave generator, and leave each other completely at the minor of the wave generator. Since the circular spline and the flexspline have different numbers of teeth, when the wave generator continuously rotates, the difference of the numbers of teeth provides reduction, thereby generating high-torque output.

For reducing wear against such a harmonic drive and maximizing its service life, many designs for lubrication have been implemented in the prior art. For example U.S. Pat. No. 7,905,326 involves filling lubricant into a lubricant-feeding hole on the flexspline through a lubricant-feeding channel formed in the circular spline, so as to lubricate the wave generator. However, since the flexspline continuous deforms during operation, stress tends to concentrate on the site of the lubricant-feeding hole and structurally damage the flexspline. Another known approach, as disclosed in Japan Patent No. JPY1994015151, involves assembling the flexspline and a lubricant-holding mechanism together by means of a mortise-tenon structure. However, this design may cause additional impacts among the lubricant-holding mechanism, the bearing and the flexspline, and adversely affect the overall lubrication efficiency.

BRIEF SUMMARY OF THE INVENTION

The primary objective of the present invention is to provide a harmonic drive featuring helix-facilitated lubrication. With the enhanced lubrication, the service life of the harmonic drive can be improved and the wear against the harmonic drive can be reduced.

For achieving the foregoing objective, the disclosed harmonic drive comprises a circular spline, a flexspline, a wave generator, and an agitating member. The wave generator has a bearing, an elliptic wheel, and a shaft coupling. The bearing is positioned in the flexspline. The elliptic wheel is positioned in the bearing. The shaft coupling is connected to the elliptic wheel, so that a lubricant-holding space is defined between the wave generator and the flexspline. The agitating member is positioned in the lubricant-holding space and has a rotatory part and a blade part. The rotatory part is connected to the shaft coupling of the wave generator. The blade part is such provided on a peripheral surface of the rotatory part that the blade part extends in a helical pattern along an axial direction of the rotatory part.

With the configuration given above, when the shaft coupling is driven by a power source to rotate, the agitating member uses the blade part to agitate the lubricant in the lubricant-holding space and generate convection, so as to make the bearing of the wave generator better lubricated.

DETAILED DESCRIPTION OF THE INVENTION

Figure 1:
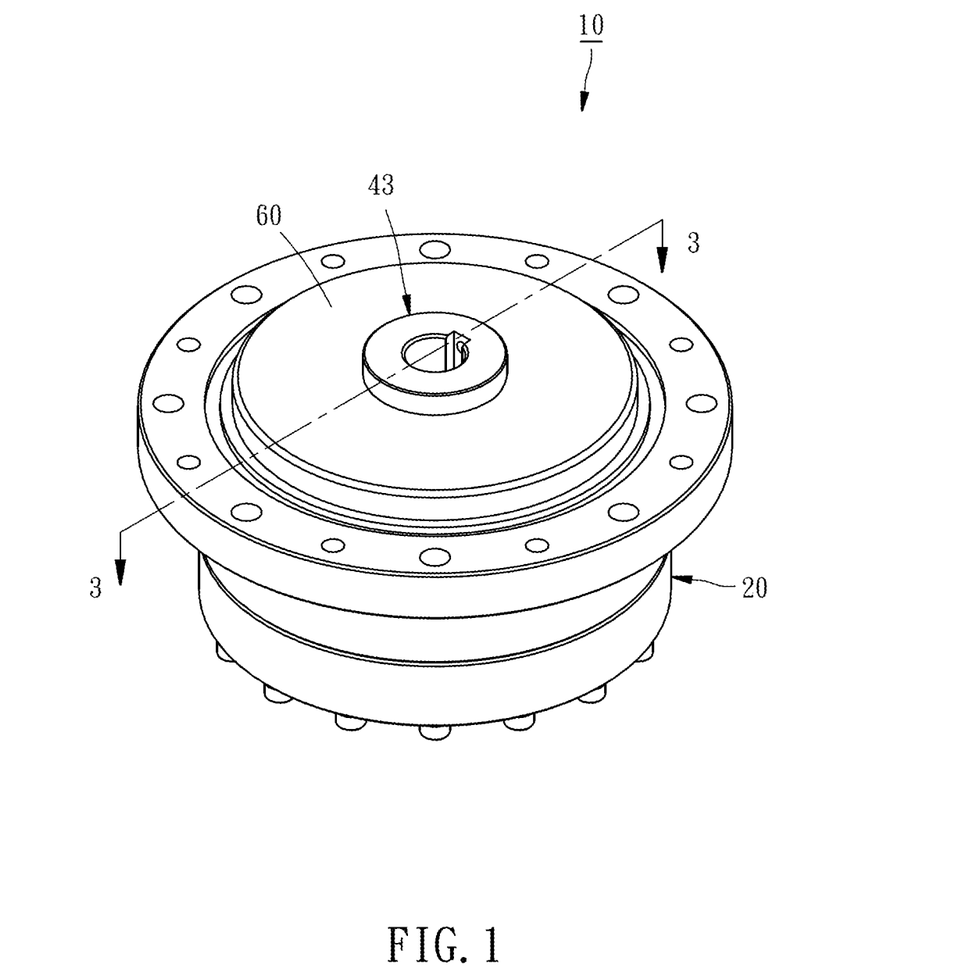
FIG. 1 is a perspective view of a first embodiment of the present invention.
Figure 2:
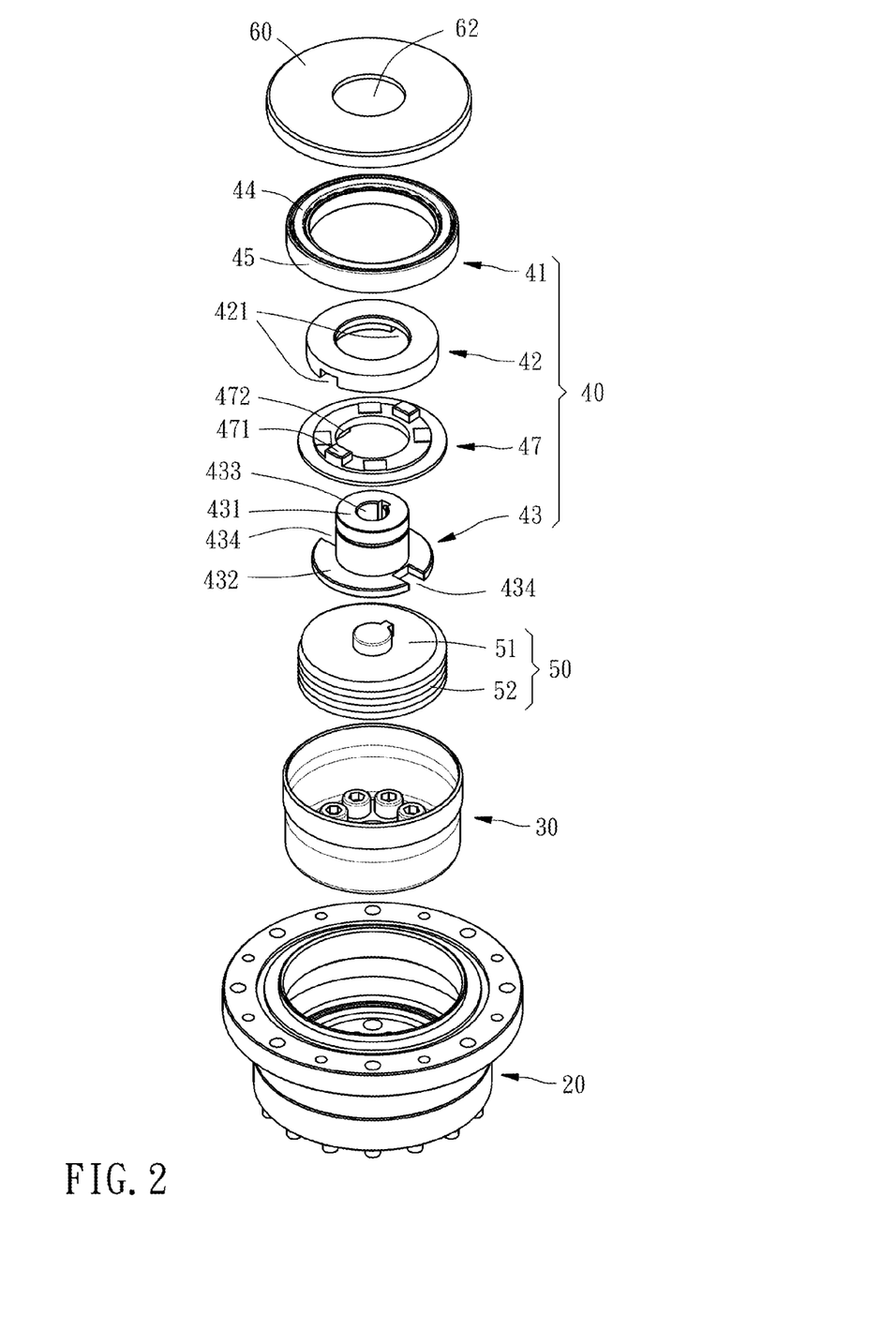
FIG. 2 is an exploded view of the first embodiment of the present invention.

Referring to FIG. 1 and FIG. 2, according to the first embodiment of the present invention, a harmonic drive featuring helix-facilitated lubrication 10 comprises a circular spline 20, a flexspline 30, a wave generator 40, and an agitating member 50.

The flexspline 30 is positioned in the circular spline 20 and meshes with the circular spline 20.

Figure 3:
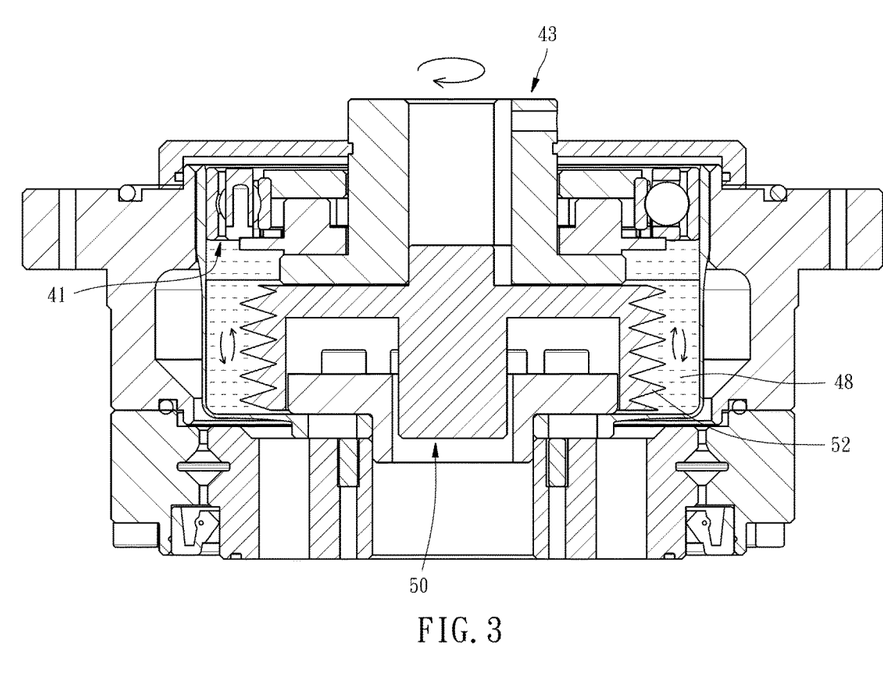
FIG. 3 is a cross-sectional view of the first embodiment of the present invention, showing convection of the lubricant during clockwise rotation of the shaft coupling.
Figure 4:
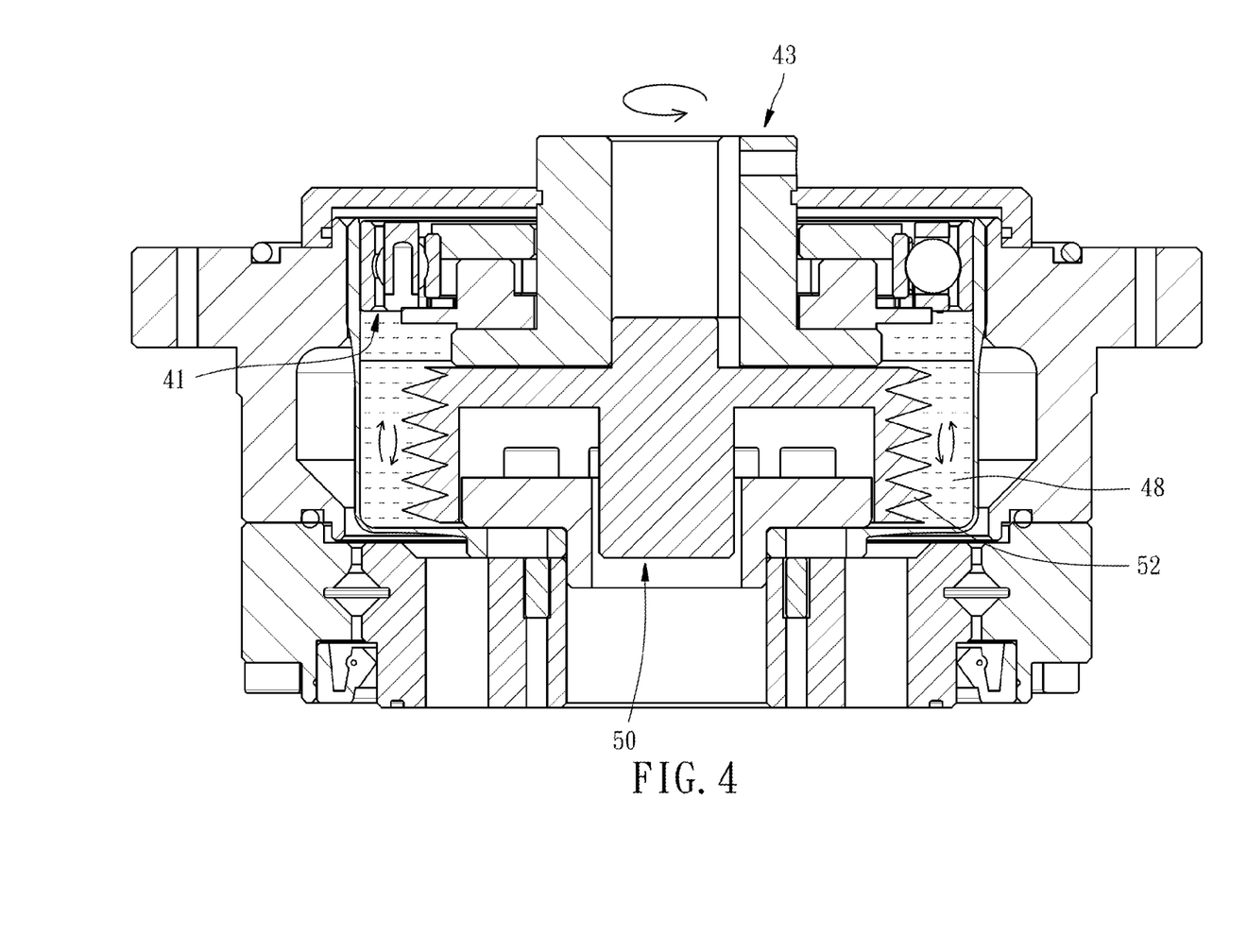
FIG. 4 is similar to FIG. 3, but showing convection of the lubricant during anti-clockwise rotation of the shaft coupling.

As shown in FIG. 2 and FIG. 3, the wave generator 40 has a bearing 41, an elliptic wheel 42, and a shaft coupling 43. The bearing 41 is positioned in the flexspline 30 and has an inner race 44 and an outer race 45 circling the inner race 44. The elliptic wheel 42 is positioned in the inner race 44 of the bearing 41. The shaft coupling 43 has a coupling portion 431, a base portion 432 connected to the coupling portion 431, and an axial hole 433 running through the coupling portion 431 and the base portion 432. In addition, the shaft coupling 43 and the elliptic wheel 42 are combined by means of an adapting plate 47. The adapting plate 47 has its two opposite sides provided with two opposite first protrusions 471 and two opposite second protrusions 472, respectively. The elliptic wheel 42 has its side facing the adapting plate 47 provided with two opposite first indentations 421. The shaft coupling 43 has its base portion 432 peripherally provided with two opposite second indentations 434. Thereby, as shown in FIG. 2 and FIG. 3, the elliptic wheel 42 has its first indentations 421 engaged with the first protrusions 471 of the adapting plate 44 and the shaft coupling 43 has its second indentations 434 engaged with the second protrusions 472 of the adapting plate 44, so that the shaft coupling 43 and the elliptic wheel 42 are assembled together. Additionally, after the wave generator 40 is installed within the flexspline 30, a lubricant-holding space 48 is formed between the wave generator 40 and the flexspline 30, as shown in FIG. 3 and FIG. 4, for holding the lubricant.

Figure 5:
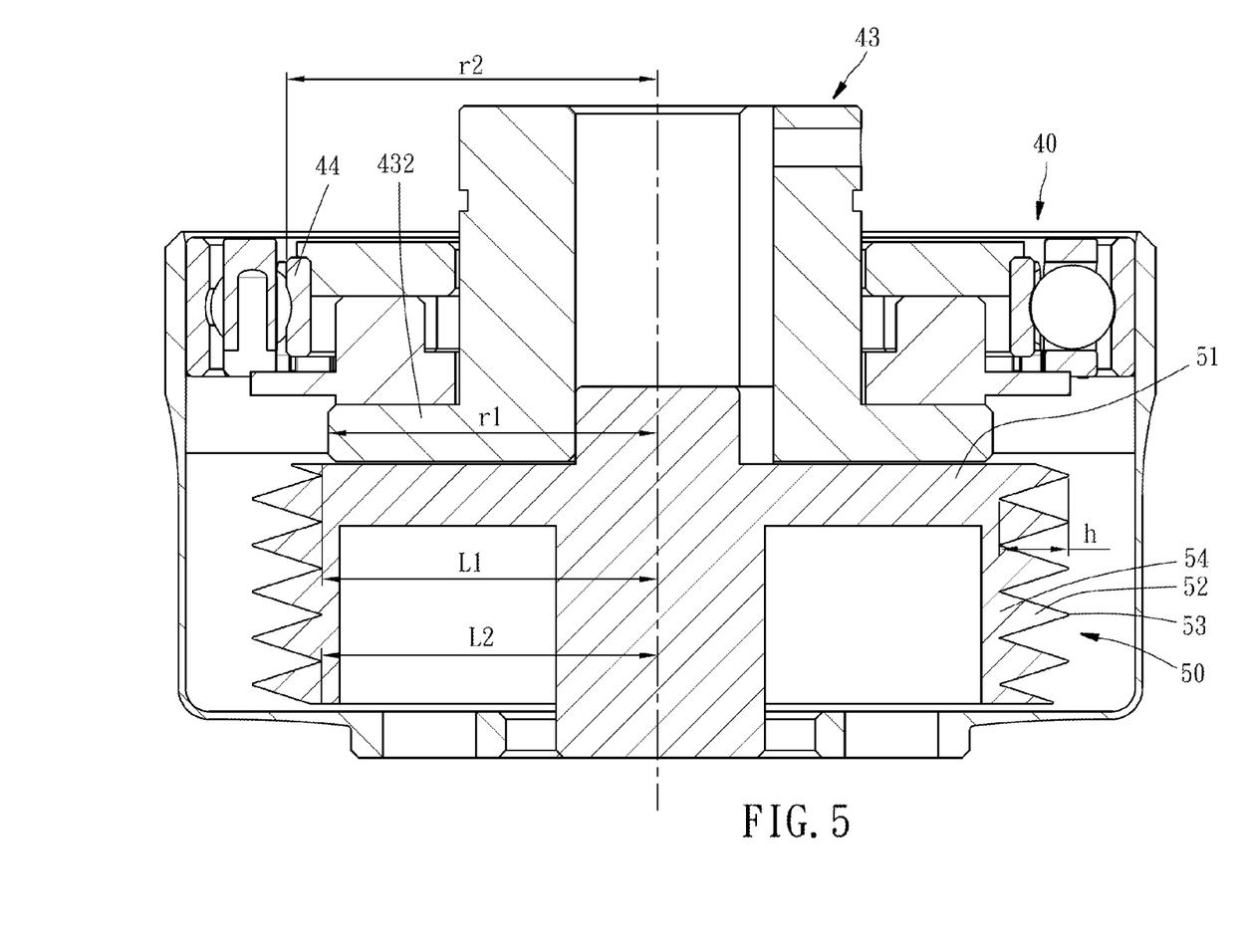
FIG. 5 is another cross-sectional view of the first embodiment of the present invention, showing the dimensional relation between the wave generator and the agitating member.
Figure 6:
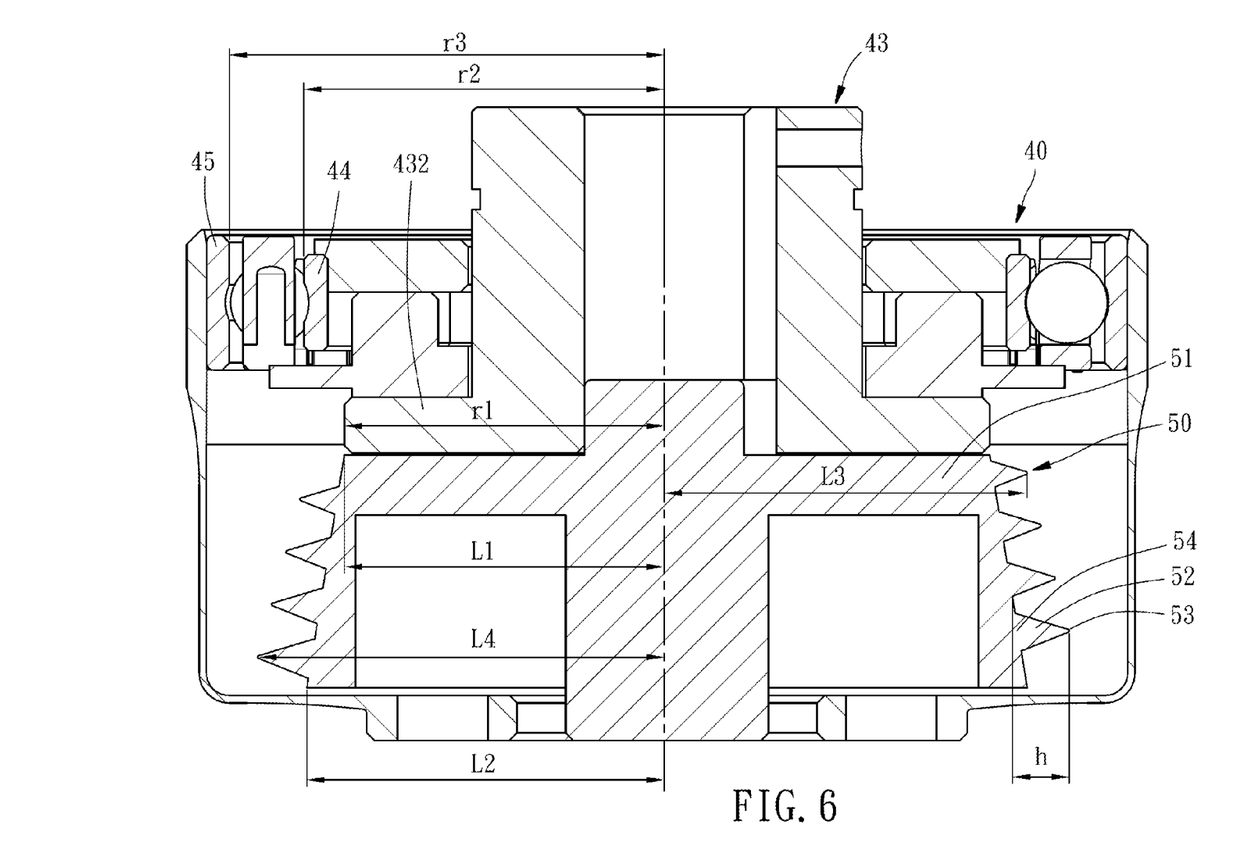
FIG. 6 is a cross-sectional view of a second embodiment of the present invention, showing the dimensional relation between the wave generator and the agitating member.

Referring to FIG. 2 and FIG. 3, the agitating member 50 is positioned in the lubricant-holding space 49 and has a rotatory part 51. The rotatory part 51 of agitating member 50 has its upper end received in the axial hole 433 of the shaft coupling 43, so that the agitating member 50 rotates with the shaft coupling 43. Moreover, in the present embodiment, the agitating member 50 has one blade part 52. The blade part 52 is attached to the peripheral surface of the rotatory part 51 and extends in a helical pattern along an axial direction of the rotatory part 51, for agitating the lubricant in the lubricant-holding space 48.

Where the rotatory part 51 of the agitating member 50 is of a cylindrical structure (as shown in FIG. 5), the relation between the agitating member 50 and the wave generator 40 is $L_1=L_2 \geq r_1$. Where the rotatory part 51 of the agitating member 50 is a cone (as shown in FIG. 6), the relation between the agitating member 50 and the wave generator 40 is $L_1 \geq r_1$ and $r_1 \leq L_1 < L_2 \leq r_2$, where $L_1$ is the radius of the upper end of the rotatory part 51 of the agitating member 50, $L_2$ is the radius of the lower end of the rotatory part 51 of the agitating member 50, $r_1$ is the radius of the base portion 432 of the shaft coupling 43, and $r_2$ is the outer diameter of the inner race 44 of the bearing 41.

For further limiting the dimensions of the blade part 52, so as to maintain a proper distance between the blade part 52 of the agitating member 50 and peripheral wall of the lubricant-holding space 48, the agitating member 50 and the wave generator 40 are such arranged that the two relations listed below are satisfied. As the first relation, $r_2-r_1 \leq h \leq r_3-r_1$, and as the second relation, $r_1 < L_3 \leq r_2$ while $r_2 \leq L_4 \leq r_3$. Where the rotatory part 51 of the agitating member 50 is of a cylindrical structure, $r_2 \leq L_3 = L_4 \leq r_3$, wherein $r_3$ is the inner diameter of the outer race 45 of the bearing 41, h is the linear distance between the tooth peak 53 of the blade part 52 and the tooth valley 54 of the blade part 52, $L_3$ is the shortest distance between the axis of the rotatory part 51 of the agitating member 50 and the tooth peak 53 of the blade part 52, and $L_4$ is the largest distance between the axis of the rotatory part 51 of the agitating member 50 and the tooth peak 53 of the blade part 52. Thereby, when the agitating member 50 rotates, the blade parts 52 can well agitate the lubricant.

In practical operation, when the shaft coupling 43 is driven by a power source to rotate clockwise, the agitating member 50 uses its helical blade parts 52 to agitate the lubricant in the lubricant-holding space 48, so as to make the lubricant flow in the direction as indicated by the arrow in FIG. 3, and sufficiently lubricate the bearing 41 of the wave generator 40. When the power source drives the shaft coupling 43 to rotate anti-clockwise, the helical blade parts 52 of the agitating member 50 drive the lubricant to flow in the lubricant-holding space 48 in the direction as indicated by the arrow in FIG. 4, thereby lubricating the bearing 41 of the wave generator 40 similarly.

To sum up, with the helical design of the blade parts 52 and the principle of fluid performing convection in closed space, the disclosed harmonic drive 10 ensures that the agitating member 50 sufficiently lubricate the bearing 41 of the wave generator 40 no matter the power source rotates clockwise or anti-clockwise. As compared to the prior art, the present invention does helps to improve the service life of the harmonic drive and reduce the wear against the harmonic drive.

Figure 7:
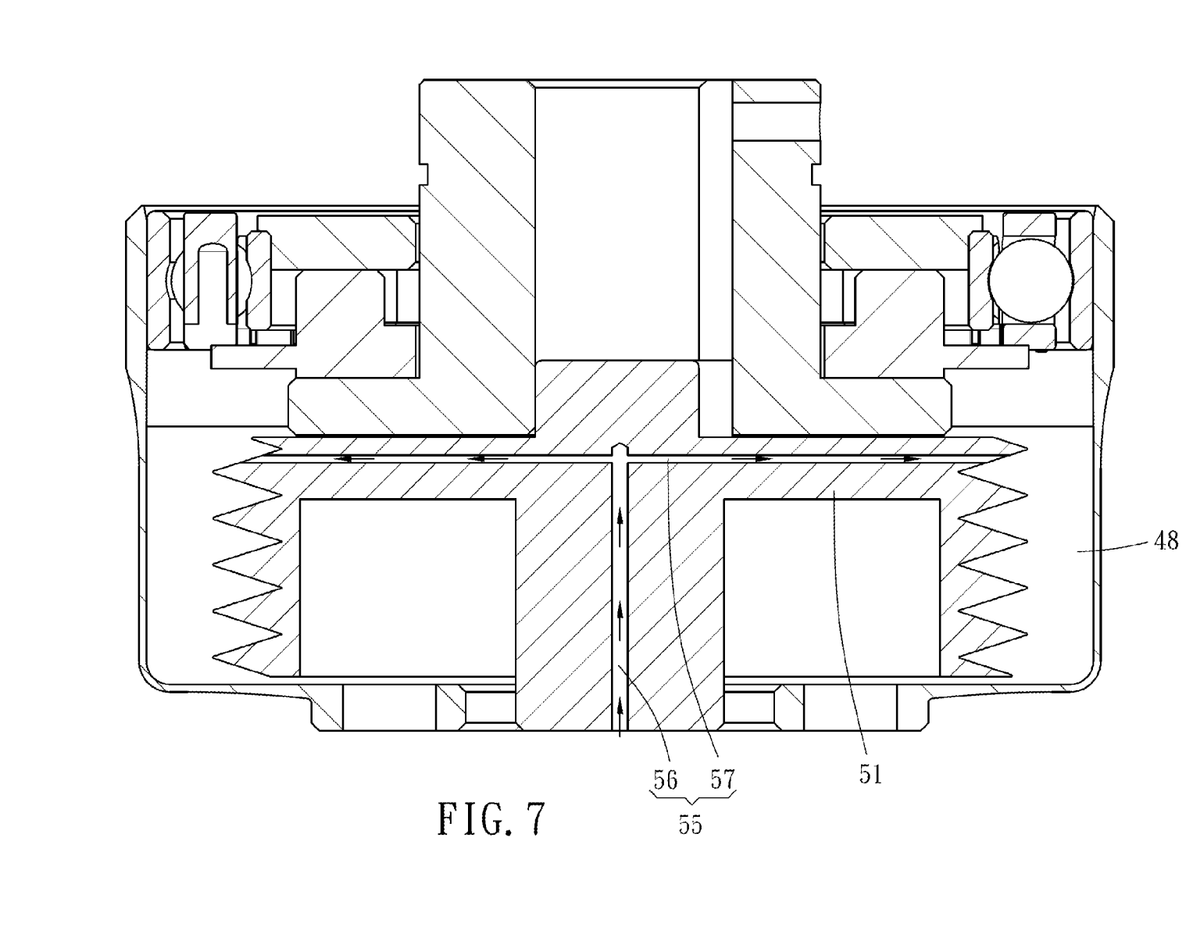
FIG. 7 is a cross-sectional view of a third embodiment of the present invention.
Figure 8:
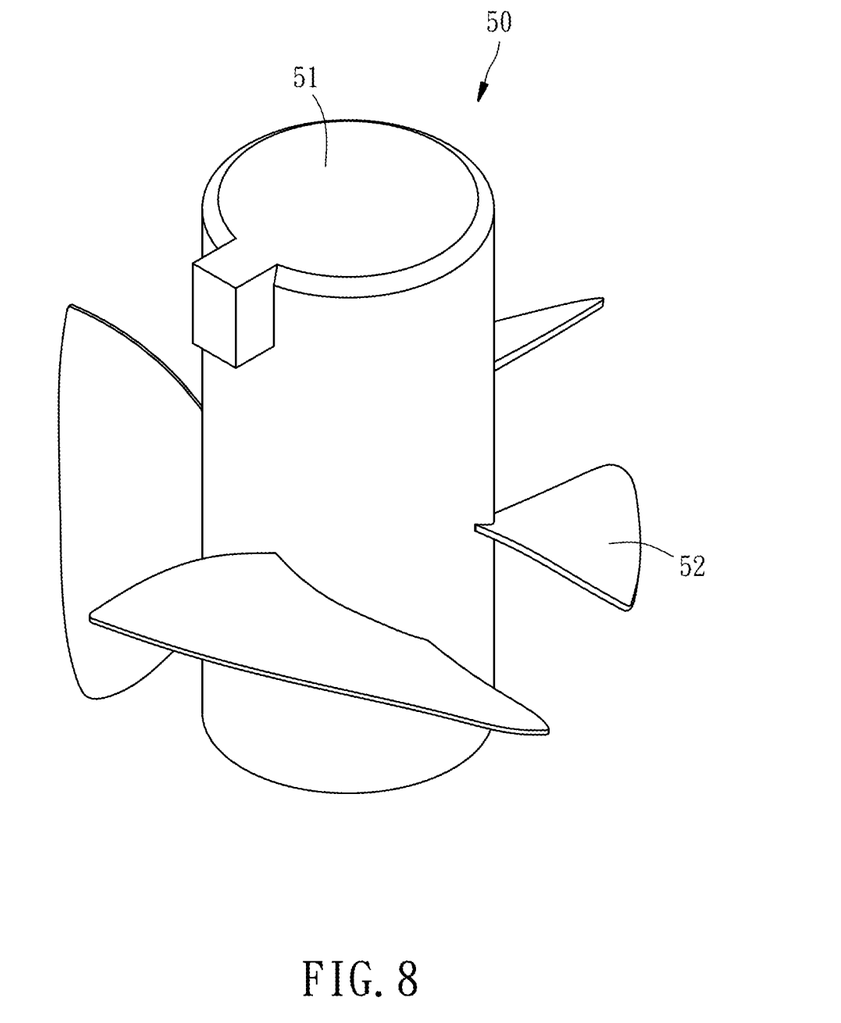
FIG. 8 is a perspective view of the agitating member according to a fourth embodiment of the present invention.

It is to be mentioned that for preventing leakage of the lubricant, the present invention further comprises an anti-leakage cover 60, as shown in FIG. 2 through FIG. 4. The anti-leakage cover 60 caps the end of the circular spline 20 and covers the wave generator 40. The anti-leakage cover 60 has a through hole 62 allowing the shaft coupling 43 to pass therethrough. In addition, for refilling the lubricant without disassembling the wave generator 40, the rotatory part 51 of the agitating member 50 has a lubricant-filling channel 55, as shown in FIG. 7. The lubricant-filling channel 55 includes a lengthwise segment 56 and a plurality of transverse segments 57. The lengthwise segment 56 extends upward from the lower end of the rotatory part 51, and each of the transverse segments 57 extends from the upper end of the lengthwise segment 56 transversely toward the lubricant-holding space 48 until the peripheral surface of the rotatory part 51, so that the lubricant-filling channel 55 and the lubricant-holding space 48 are communicated mutually. Thus, it is possible to fill lubricant into the lubricant-holding space 48 through the lubricant-filling channel 55. As to the blade parts 52 of the agitating member 50, each of the blade parts 52 may have a triangular or trapezoid cross-sectional shape, without limitation. As shown in FIG. 8, there may be plural blade parts 52. The blade parts 52 are attached to and spaced on the peripheral surface of the rotatory part 51 with an interval set therebetween and arranged in a helical pattern along an axial direction of the rotatory part 51. Thereby, when the agitating member 50 rotates, the lubricant in the lubricant-holding space 48 is agitated.

What is claimed is:

1. A harmonic drive featuring helix-facilitated lubrication, comprising:
   a circular spline;
   a flexspline, being positioned in the circular spline so as to mesh with the circular spline;
   a wave generator, having a bearing positioned in the flexspline, an elliptic wheel positioned in the bearing, and a shaft coupling connected to the elliptic wheel, so that a lubricant-holding space is defined between the wave generator and the flexspline; and
   an agitating member, being positioned in the lubricant-holding space and having a rotatory part and at least one blade part, wherein the rotatory part is connected to the shaft coupling of the wave generator, and the blade part is such provided on a peripheral surface of the rotatory part that the blade part extends in a helical pattern along an axial direction of the rotatory part.

2. The harmonic drive of claim 1, wherein the bearing of the wave generator has an inner race, and the shaft coupling of the wave generator has a coupling portion and a base portion connected to the coupling portion, in which a relation exists between the wave generator and the agitating member that $L_1 \geq r_1$ while $r_1 \leq L_2 \leq r_2$, where $L_1$ is a radius of an upper end of the rotatory part of the agitating member, $L_2$ is a radius of a lower end of the rotatory part of the agitating member, $r_1$ is a radius of the base portion of the shaft coupling, and $r_2$ is an outer diameter of the inner race of the bearing.

3. The harmonic drive of claim 1, wherein the shaft coupling of the wave generator has a coupling portion and a base portion connected to the coupling portion, in which a relation exists between the wave generator and the agitating member that $L_1=L_2 \geq r_1$, where $L_1$ is a radius of an upper end of the rotatory part of the agitating member, $L_2$ is a radius of a lower end of the rotatory part of the agitating member, and TI is a radius of the base portion of the shaft coupling.

4. The harmonic drive of claim 1, wherein the bearing of the wave generator has an inner race and an outer race circling the inner race, and the shaft coupling of the wave generator has a coupling portion and a base portion connected to the coupling portion, in which a relation exists between the wave generator and the agitating member that $L_3 \leq L_4$ while $r_2 < L_3 \leq r_3$ while $r_2 \leq L_4 \leq r_3$, where $L_3$ is a shortest distance between an axis of the rotatory part of the agitating member and a tooth peak of the blade part, $L_4$ is a largest distance between the axis of the rotatory part of the agitating member and a tooth peak of the blade part, $r_1$ is a radius of the base portion of the shaft coupling, and $r_2$ is an outer diameter of the inner race of the bearing, and $r_3$ is an inner diameter of the outer race of the bearing.

5. The harmonic drive of claim 1, wherein the bearing has an inner race and an outer race circling the inner race, and the shaft coupling of the wave generator has a coupling portion and a base portion connected to the coupling portion, while the blade part of agitating member has a tooth peak and a tooth valley, in which a relation exists between the wave generator and the agitating member that $r_2 - r_1 \leq h \leq r_3 - r_1$, where $r_1$ is a radius of the base portion of the shaft coupling, $r_2$ is an outer diameter of the inner race of the bearing, $r_3$ is an inner diameter of the outer race of the bearing, and h is a linear distance between the tooth peak of the blade part and the tooth valley of the blade part.

6. The harmonic drive of claim 1, wherein the blade part comprises plural said blade parts, and each two adjacent said blade parts are arranged on the peripheral surface of the rotatory part with an interval set therebetween.

7. The harmonic drive of claim 1, wherein the blade part has a triangular or trapezoid cross-sectional shape.

8. The harmonic drive of claim 1, wherein the rotatory part of the agitating member includes a lubricant-filling channel that is communicated with the lubricant-holding space.

9. The harmonic drive of claim 8, wherein the lubricant-filling channel includes a lengthwise segment and a transverse segment, in which the lengthwise segment extends upward from a lower end of the rotatory part, and the transverse segment extends form an upper end of the lengthwise segment toward the lubricant-holding space until the peripheral surface of the rotatory part.

10. The harmonic drive of claim 1, wherein the elliptic wheel and the shaft coupling are connected by means of an adapting plate, in which the adapting plate has two opposite sides provided with at least one first protrusion and at least one second protrusion, respectively, while the elliptic wheel has at least one first indentation for meshing with the first protrusion of the adapting plate so as to combine the elliptic wheel with the adapting plate, and the shaft coupling has at least one second indentation for meshing with the second protrusion of the adapting plate.

* * * * *